United States Patent [19]
Wales

[11] 3,816,979
[45] June 18, 1974

[54] METHOD AND APPARATUS FOR CLEANING TUBE TYPE FABRIC FILTERS

[75] Inventor: Roger O. Wales, Red Wing, Minn.
[73] Assignee: The Torit Corporation, St. Paul, Minn.
[22] Filed: Dec. 22, 1971
[21] Appl. No.: 210,898

[52] U.S. Cl............................ 55/96, 55/302, 55/341
[51] Int. Cl.............................................. B01d 46/04
[58] Field of Search....................... 55/96, 271–273, 55/283, 286, 287, 288, 291–293, 302, 303, 361; 210/333, 410–412

[56] References Cited
UNITED STATES PATENTS

| | | | |
|---|---|---|---|
| 1,163,318 | 12/1915 | Bryant | 55/298 |
| 3,095,289 | 6/1963 | Egan | 55/96 |
| 3,325,979 | 6/1967 | Smith | 55/96 |
| 3,376,696 | 4/1968 | Wells et al. | 55/302 |

FOREIGN PATENTS OR APPLICATIONS

| | | | |
|---|---|---|---|
| 909,345 | 10/1962 | Great Britain | 55/294 |
| 812,244 | 4/1959 | Great Britain | 55/283 |
| 1,016,556 | 1/1966 | Great Britain | 55/302 |

Primary Examiner—Bernard Nozick
Attorney, Agent, or Firm—Schroeder Siegfried, Ryan and Vidas

[57] ABSTRACT

A filtering apparatus including a plurality of tubular fabric type filter elements open at both extremities and positioned in a frame in vertical position with contaminated air to be directed therethrough from the upper extremity through the walls of the tubular filtering elements. The fabric type filter elements are cleaned by creating air curtains at the open extremities thereof causing an internal drop in pressure in the filtering elements due to the blockage of airflow therethrough and resulting in collapse of the filtering elements and reverse airflow through the bag to remove particulates entrained in the fabric and allowing the same to be deposited by gravity through the lower opening of the filtering elements.

15 Claims, 5 Drawing Figures

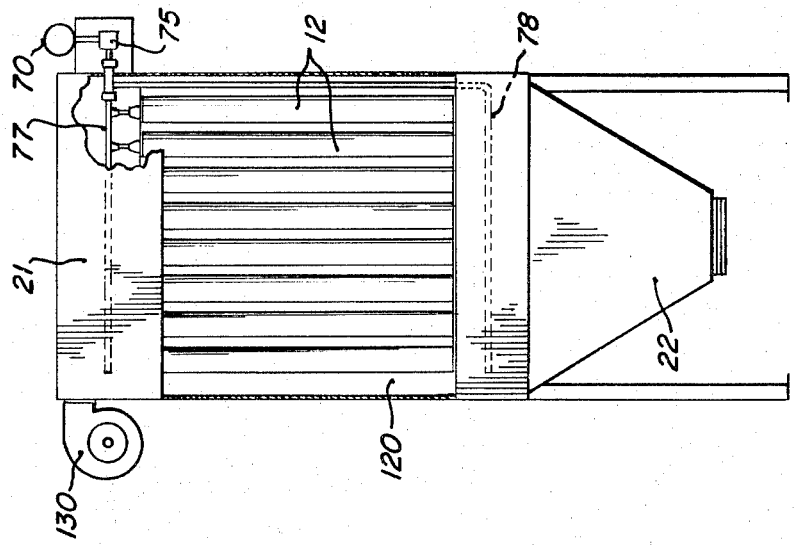
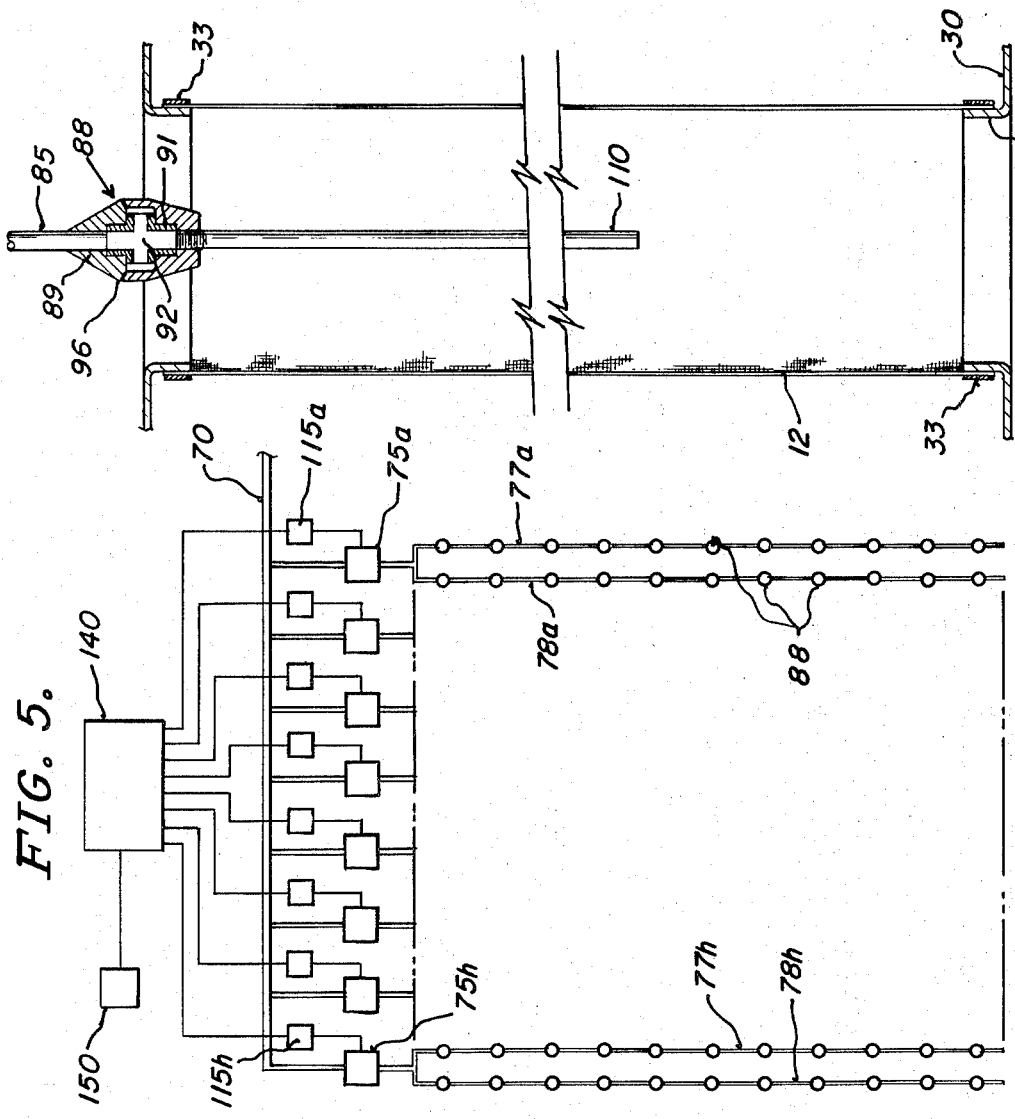

METHOD AND APPARATUS FOR CLEANING TUBE TYPE FABRIC FILTERS

My invention relates to filtering apparatus using tubular fabric type filter elements and more particularly to an improved filtering apparatus of this type incorporating a structure to provide an improved and new method of cleaning the filter elements while maintaining continuous filtering operation of the apparatus.

Filtering apparatus employing tubular bag type fabric filters are well known and the same have employed a variety of bag type configurations and methods of cleaning the same. The most common in the bag type filter element is one which is closed at one extremity and these are generally mounted in a tube house or frame in a vertical position such that contaminated air or the medium to be filtered is introduced into the open end of the filtering element with the dust type contaminants or particulates being deposited on the inner walls of the filter element and the filtered air passing through the walls of the bag to be discharged therefrom. In such structures the contaminated air or medium to be filtered is normally introduced at the lower extremity of the vertically displaced filter bags or elements and this structure is cleaned by mechanically agitating or shaking the bags from the closed extremity to deposit the particulates through the open extremity into a dust hopper positioned below the same. In certain instances, the positioning of the bag type filters are reversed with the closed extremities being positioned at the lowest point of the tube house and contaminated air being directed through the walls to the interior of the bags and being discharged through the open end thereof. This entrains the particulates on the outer wall of the bag and the same are removed by agitating of the bags. In either arrangement, the mechanical agitating structure produces physical strain and wear in the bags and the direction of airflow therethrough upon the resumption of filtering cycle after an interrupted cleaning cycle causes reentrainment of part of the contaminant particles on the respective surfaces of the bags providing for an inefficient cleaning and undue wear and maintenance on the bags. Cleaning of such structures has also been effected by means of a reverse cycle flow in which the normal filtering operation is halted and airflow through the tube house or plenum containing the filtering elements is reversed to effect cleaning of the particulates from the respective surfaces of the filter elements. This requires interrupted flow of the filtering operation which presents a disadvantage as well as an inefficient cleaning cycle.

Filtering apparatus of this type have also employed jet nozzles as the cleaning structure in which the nozzles have been introduced through the closed extremities of the bag type filters and provide for a pulse of compressed air in the interior of the bags to dislodge contaminant particles from the filtering surface causing them to be deposited in a lower hopper or dust chamber. However, such structures provide for complicated mountings of bags and the direction of airflow upon resumption of the filtering cycle after the pulsed jets of air is such as to normally effect re-entrainment of part of the contaminant particles loosened from the surfaces of the filter elements. Further, filtering apparatus of this type have been constructed in which both extremities of the bag type filter are open and are mounted such that contaminated air will be directed through an open extremity of the same to pass through the walls of the filtering element and deposit particulates on the interior surface thereof. Cleaning apparatus for this type of structure have employed jet nozzles on the interior and exterior of the bag to mechanically agitate the same and such structure have required special mountings of the tubular filtering elements or bags to enable the agitated movement for cleaning of the same causing wear on the bags and increased costs of installation.

The present filtering apparatus employs a plural bag configuration in which the tubular bag type filtering elements are open at each extremity and are mounted between baffle or divider plates with apertures therein in a vertical position and with a normal down flow of air during the filtering operation through the open top extremities of the filter bags. The particulates are then deposited on the inner walls of the filter elements and the filtered air is discharged through the walls of the bags. The improved structure employs a means for introducing an air curtain of a pressure higher than the pressure inducing airflow through the bags to effectively block both ends of the bags or filtering elements causing an internal reduction in pressure therein. The bags which are conventionally mounted and require no internal framing because of the normal direction of airflow therethrough collapse because of the pressure differential between the inner and outer walls thereof and a reverse airflow is provided because of the drop in pressure removing the entrained contaminant particles from the inner wall of the filter bags. The curtains are generated by pulsed airflow and the release of the curtains permitting normal airflow therethrough will be in such a direction as to move the contaminant particles to the discharge hopper without re-entrainment of the particles. No special structure is required for providing the reverse airflow through the bags and the overall configuration permits continuous filtering operation with cleaning from a fraction of the total number of filtering elements while the remainder are providing a normal filtering operation. By sequentially altering the bags being cleaned, a continuous filtering and cleaning operation takes place with no interruption in the filtering cycle, and an effective cleaning of the bags is provided without special mounting for the same minimizing wear on the bags and improving the operating characteristics and life of the same.

Therefore it is the principal object of this invention to provide an improved filtering apparatus and structure for cleaning the same.

Another object of this invention is to provide an improved method of cleaning tubular fabric type filters.

A further object of this invention is to provide a general configuration of parts in a tube house type filtering structure in which the direction of airflow and the force of gravity will aid in the removal of the particulates from the filtering elements.

A still further object of this invention is to provide a filtering apparatus in which continuous filtering operation may be effected with selected cleaning of certain of the filtering elements and an alteration of the same during the normal filtering cycle until all elements are cleaned.

A still further object of this invention is to provide a filtering apparatus in which the filtering cycle does not require an interruption of the filtering operation thereby reducing maintenance costs.

A still further object of this invention is to provide an improved filtering apparatus in which filtering and cleaning may be automatically scheduled and effected.

These and other objects of this invention will become apparent from a reading of the attached description together with the drawings wherein:

FIG. 3 is an enlarged view of an alternate embodiment of the nozzle configuration affecting the air curtains for the filtering elements;

FIG. 4 is an elevation view of an alternate embodiment of the tube house employing the apparatus and improved cleaning structure; and FIG. 5 is a schematic circuit diagram showing the controls for the same.

Figures 1, 2:
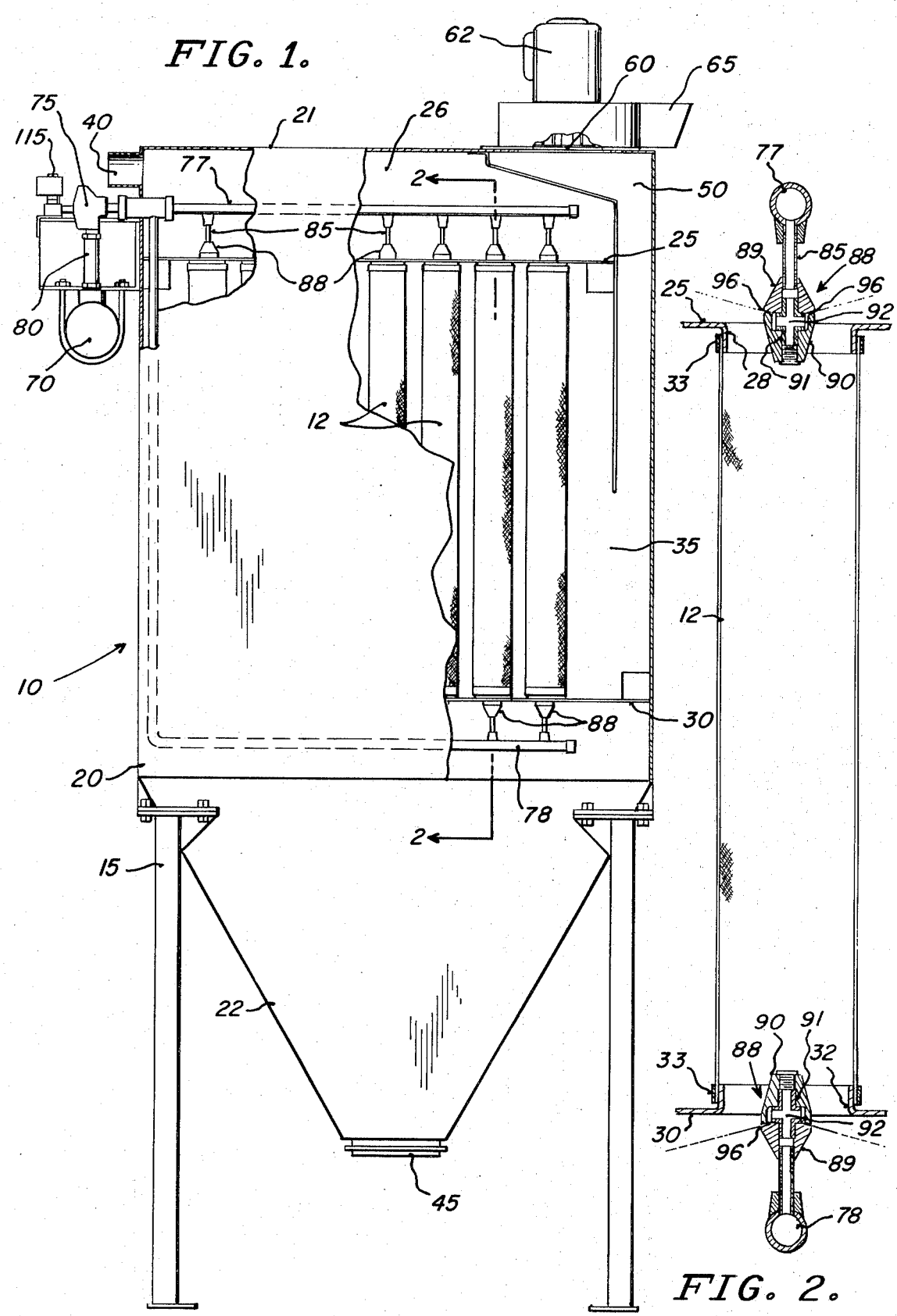
FIG. 1 is an elevation view of a tube house type filtering apparatus with parts in section embodying my invention.
FIG. 2 is a sectional view of a filtering element taken along the line 2—2 in FIG. 1 showing the cleaning apparatus therefore.

My invention in an improved filtering apparatus with novel cleaning structure and method is shown in the drawings in connection with a tube house or enclosure 10 in FIG. 1 which mounts a plurality of bag type filter elements 12 in a vertical position and through which contaminated air is directed for filtering purposes. The tube house or enclosing structure includes an upright frame structure 15 having enclosed sides 20 and top 21 with a truncated pyramidal enclosure 22 at the bottom of the same defining the dust or contaminant chamber for the tube house. Within the enclosure, the interior is divided by a first divider or baffle plate 25 having a plurality of apertures therein and affixed to the frame and side walls of the enclosure to define with the top an input plenum 26. The filter elements 12 are tubular fabric type structures open at both extremities and the apertures within the baffle plate 25 include flanges 28 surrounding the apertures to which the upper end of each of the bag type filter elements 12 are attached through suitable means such as clamps 33. Within the enclosure is positioned a second divider or baffle plate 30 having a similar number of apertures and upwardly extending flange members 32 surrounding the same which serve to mount the lower ends of the filter elements through suitable means such as clamp-type fasteners. The filter elements extend between the baffle plates which define with the side walls 20 a second enclosure 35 or the outlet plenum of the tube house with the filter elements stretched to extend between the baffle plates 25, 30 and without the requirement of internal supporting frames to hold the bag type filters in an extended and open position. The input plenum or upper portion of the tube house has an air inlet duct 40 positioned therein through which air is introduced to the tube house. This may be connected through duct work to an area in which the air is to be cleaned or as will be hereinafter noted, may be open to atmosphere under conditions in which the tube house is positioned within the area to be cleaned. The truncated pyramidal bottom enclosure 22 extends from the second baffle plate and includes a suitable access door 45 by means of which dirt or particulates which accumulate in the dust chamber may be removed therefrom. Although not shown, it is understood that the door may be replaced by a suitable auger means which would automatically or periodically remove particulates from the chamber as desired. The tube house enclosure includes a duct type passage 50 common with the chamber 35 or outlet plenum extending to the top of the tube house and to the inlet side of the discharge fan or exhaust fan 60 powered by an electric motor 62 with the outlet of the fan housing as indicated at 65 being connected to a discharge to atmosphere or through suitable duct work to a remote point. Thus with operation of the exhaust fan or discharge fan, contaminated air will be drawn in through the inlet duct 40 to the plenum 26 and through the apertures in the baffle 25 through the interior of the tubular filter elements 12. The air will pass through the walls fo the filter elements which will remove the particulates or dust and the clean air in the plenum chamber 35 will be drawn through the exhaust fan 60 to be discharged through the exhaust duct 65 of the fan. The dirt or particulates removed will be positioned on the inner surface of the bag type filters and when loosened, as will be hereinafter noted, will fall through the lower open extremity of the filter elements and the apertures in the second baffle plate 30 due to the force of gravity and air movement, as will be hereinafter noted, into the dust chamber 22 where it will be manually or automatically removed.

The tube house filtering apparatus includes a cleaning structure which will best be seen in its preferred embodiment in detail in FIG. 2. It utilizes a high pressure air source, such as is indicated by the pipe 70, directed through the wall of the tube house and through control valves 75 to a plurality of manifolds 77, 78. Each manifold directs high pressure air for cleaning purposes, as will be hereinafter defined, to a group of the plurality of filter elements included in the tube house. The high pressure source is directed through a suitable piping to a plurality of control valves each having associated therewith a manifold servicing a group of the filter elements such that all of the filter elements will have associated therewith a cleaning apparatus which is fed through one of the plurality of manifolds and controlled by one of the plurality of control valves as will be best seen in FIG. 5. For simplicity purposes, the tube house, which is generally rectangular in cross section, will have a plurality of rows of filter elements positioned therein and each manifold will be directed across the tube house to feed all the filters aligned in a row with an associated control valve controlling airflow thereto. The same control valve will also control air-flow to a similar manifold 78 at the bottom of the tube house positioned below the baffle plate 30 to direct high pressure air at the lower extremity of the respective filter elements. Thus a plurality of manifolds in rows will extend across and be aligned with rows of the filters at both the top and bottom of the tube house or on the inlet and dust chamber sides respectively, of the baffles 25 and 30 and, as will be hereinafter noted, the respective valves will be selectively operated so that high pressure air from the source 70 will be directed into one of the manifolds 77 and 78 connected in common with one of the control valves 75 at any one period of time. Thus, as will be seen in FIG. 1, the inlet pipe 70 or one connected thereto will feed a branch pipe 80 connected to one of the control valves 75 and a similar installation will be connected for each of the parallel manifolds 77, 78 extending across the tube house. Each of the respective control valves 75 will direct airflow through the respective manifold to a second branch pipe, as indicated at 85, leading to a nozzle structure 88 formed by three parts 89, 90 and 91 extending down into the orifice or opening in the baffle plate 25 at the open upper extremity of the respective filter element. The part 91 has passages 92 therethrough leading to a plenum which feeds air to the conical exit slit 96 around the peripheral surface of the composite nozzle structure to direct high pressure air upwardly and outwardly away from the confines of the tubular filter element 12 to provide a continuous circular air curtain covering the opening through the baffle plate to the inlet plenum chamber. This will effectively block airflow through the opening and into the filter element. As will be seen in FIG. 2, a similar structure exists from the manifold pipe 78 extending beneath the baffle plates 30 with the nozzles projecting upwardly into the openings in the baffle plate to provide an air curtain at the lower extremity of the tubular filtering elements. Again the nozzles therein are directed away from the filter element and the combined effect of the air curtains which are simultaneously created by operation of the respective control valve associated with the respective manifolds 77, 78 is to provide a pumping action reducing the air pressure within the interior of the respective bag type filter element. This pumping action creates a pressure drop in the interior of the tube and during the pulsed air curtains which are provided by momentary operation of the control valves. It will be understood, that all filter elements common with the same manifolds 77, 78 will have the same air curtains developed therein and the same drop in pressure within the group of filter elements to which the air curtains are applied. This drop in pressure within the interior of the respective filter elements will cause collapse of the walls of the same inwardly due to the pressure differential existing between the interior and exterior of the bags and will cause a reverse airflow through the bag such that air in the plenum chamber 35 will be directed back through the bag type filters in addition to collapsing the same. This reverse airflow will aid in the removal of the particulates from the inner surface of the bag which will drop by gravity through the bag and the openings in the lower extremity of the same into the dust chamber below.

The cleaning operation provides for a series of pulses separated by a time period which would allow for normal airflow into the bag after the curtain subsides and this air-flow will aid in removing the particulates suspended in the interior of the bag directing the same into the dust chamber in assisting the force of gravity in movement of the particles downward. This will prevent re-entrainment of the particles so removed from the surface back into the surface again with renewed airflow. After several pulses, for example three or four, the particular group of bags undergoing cleaning operation with the creation of the pulsed curtains at the extremities of the same will again be placed under normal filtering operation and the next or a new group of bags will be subjected to a cleaning operation with operation of their associated valve and the introduction of high pressure air into the manifolds connected thereto. This operation will be repeated continuously until all bags in the filter house are subjected to a cleaning operation and at no time will more than one group of bags be subjected to a cleaning operation. For example, in a tube house having eighty bags and depending upon the alignment configuration of the bags suspended between the baffle plates, there could be eight rows of ten bags per row with each row being connected to and in common with one of the upper and lower manifolds 77, 78. Thus ten bags would be subjected to a cleaning operation with operation of the respective valve while the remaining seventy bags would be receiving contaminated air from the input plenum chamber and maintaining a continuous filtering operation for the filtering house at 87 percent total capacity of the tube house. By sequentially selecting groups for cleaning through a sequence, to be later described, the cleaning and filtering operation would be continuous such that the continuous filtering operation would be provided with at least 87 percent total capacity for the bags or filtering elements of the particular filtering apparatus. The continuous cleaning insures for maximum efficiency in filtration since the bags will not be allowed to get too dirty before cleaning is effected. Similarly the cleaning action is less violent and consequently causes less mechanical wear on the surface of the bags increasing the life of the same.

FIG. 3 shows schematically in section an alternate embodiment of the cleaning structure in which the nozzle 88 is positioned at the upper extremity of the tube house for each of the bags in each of the groups and connected to the common manifold with a pipe leading from the nozzle, such as is indicated at 110, and directed down through the interior of the bag at least half way through the extent of the same. The pulsed air being directed to the nozzle will also be directed down the jet pipe 110 and will create a jet of air at the extremity of the same directed to the open lower end of the bag which will create the secondary air curtain or air curtain at the lower end of the bag to perform the same function as the lower nozzle 88 positioned and described in connection with FIGS. 1 and 2. Thus an internal pressure drop will be created within the bag as a result of the pulsed high pressure air being directed to the nozzle and pipe which will cause the bag to collapse inwardly and to provide for a reverse airflow through the bag to remove the entrained particulate positioned on the interior surface of the bag. At the end of the pulsed air creating the respective curtains at the uppper and lower extremities of the bag, normal airflow into the respective bag will be re-initiated removing the suspended particles within the interior of the bag and directing them into the contaminant or dust chamber at the lower portion of the tube house.

The tube house configuration for the filtering apparatus may take varying configurations depending upon the application of the same and consistent with the normal airflow cleaning structure and cleaning cycle outlined above. An alternative to the construction shown in FIG. 1 is shown in FIG. 4 in which the enclosing structure at the tube house or frame surrounding the filter elements is removed, as at 120, exposing the same to atmosphere. In this instance, contaminated air would be directed to the inlet plenum through a duct-work which would include an exhaust fan 130 located to force air into the inlet of the plenum and force air therethrough into the filtering elements exhausting the same through the walls of the filtering elements to atmosphere. Either of the cleaning nozzle structures shown in connection with FIGS. 2 or 3 may be employed and the filtering operation would be the same as in the completely enclosed tube house except for the location of the exhaust fan.

In FIG. 5, a schematic control circuit is shown in which the manifolds for the example illustrated above, that is eight groups of 10 filters, each would be identified by the manifolds 77a through h each being connected through a respective control valve 75a through h to introduce air under high pressure from the high pressure source or pipe 70. Each of the control valves 75 are operated by an electromagnet and the respective electromagnets as indicated at 115a through h control respectively the valves 75a through h. The electromagnets are each connected to an electronic or electrical synchronizer or sequencer shown in block form, which sequencer would selectively energize the electromagnets in the sequence and for each sequence would pulse the electromagnets several times to perform a desired cleaning operation. As indicated in FIG. 5, the sequence control would have associated therewith a pressure responsive device 150 which would respond to the pressure differential across the filtering apparatus as a whole to indicate the condition of cleanliness of the bags. Under conditions where the bags were relatively clean, continuous operation of the sequencer would not be required and the pressure responsive device would operate as an override to prevent a re-initiation of the sequencer after a complete sequence of operation until such a time as the pressure drop indicated the need for renewed cleaning. Under these conditions, the operation of the sequencer would be reinitiated and groups of the bags under filtering operation would be subjected to the high pressure air source creating the air curtains at the respective nozzles to effectively block the ends of the filtering elements of each group causing the pressure drop internally within the respective filtering elements and the collapse of the same removing the particulates from the walls with the reverse airflow created by the pressure drop. The pulsed operation when completed would be followed by a period of normal filtering operation or airflow through the tubes aiding the effect of gravity to direct the loosened particles into the dust chamber. Depending upon the cleaning cycle involved, several of such pulsed operations for each group through operation of the respective control valve 75 as energized by the respective electromagnet 115 would take place at which time the sequencer would advance and select a new group of filter elements to be cleaned.

With the improved filtering apparatus, 80 to 90 percent of the bags would always be on the line performing the normal filtering operation for the filtering apparatus while 10 to 20 percent of the bags would be subjected to a cleaning operation. This would give substantially full filtering operation continuously with sequential cleaning to insure that the bags were maintained in a substantially clean condition at all times and preventing the excessive re-entrainment or buildup of contaminant particles on the inner walls of the filtering elements. Where continuous cleaning cycles are not necessary, as indicated by the operation of the pressure responsive device, the cleaning sequence can be stopped until such a time as the cleaning cycles are needed as indicated by the pressure responsive device. This will minimize wear on the respective filter elements.

In considering this invention it should be remembered that the present disclosure is illustrative only and the scope of the invention should be determined by the appended claims.

What is claimed is:

1. The method of cleaning tubular fabric type filter elements which are open at both extremities and which filter airflow by admitting contaminated air through one extremity and filter particulates therefrom by passing air through the walls thereof comprising; creating pulsed air curtains at the open extremities of each bag type filter being cleaned and directing the curtains outwardly away from the interior of the filter elements during the normal filtering operation to block contaminated airflow into the filter element and causing a drop in pressure therein whereby the walls of the bag filter collapse inwardly due to a reverse airflow therethrough; and thereafter removing the air curtain at the extremities of the filter element being cleaned and permitting contaminated airflow into the filter elements to cause the particulates on the inner walls of the filter element to be discharged through the other extremity of the filter element.

2. The method of cleaning tubular fabric type filter elements of claim 1 in which the air curtain at the extremities of the filter element is created by directing a pulsed air pressure higher than the pressure of the contaminated airflow through the filter elements to nozzles positioned at the extremities of the filter elements.

3. The method of cleaning tubular fabric type filter elements of claim 1 in which selected filter elements have air curtains created at the extremities of the same while the remainder of the filter elements receive contaminated air to maintain a normal filtering operation therethrough and in which the airflow through the filter elements in the normal filtering operation creates an outside air pressure on the filter elements having the air curtain created therein and a reverse airflow into said filter elements to coact with the reduced internal air pressure therein.

4. The method of cleaning tubular fabric type filter elements of claim 3 in which the selected filter elements having the air curtains created at the extremities of the same are periodically changed with filter elements subjected to a normal filtering operation and in which there are only ten to fifteen percent of the filter elements of a group of filter elements being cleaned by creating the pulsed air curtain therein while the remainder of the filter elements are subjected to contaminated air in a normal filtering operation.

5. The method of cleaning tubular fabric type filter elements of claim 4 in which the steps of creating pulsed air curtains in the tubular filter elements being cleaned are repeated several times before selecting other filter elements for cleaning.

6. A filtering apparatus comprising a framed enclosure, a plurality of tubular fabric type filter elements open at both extremities and positioned within said framed enclosure, a first divider plate positioned in the framed enclosure and having a plurality of openings therein with said first plate mounting the upper extremity of each of said filter elements at said plurality of openings, a second divider plate positioned in the framed enclosure having a plurality of openings therein and mounting the opposite extremity of each of said filter elements to position the filter elements in the elongated vertical position, means including the framed enclosure connected to the second divider plate and defining a dust chamber located beneath the second divider plate and having a discharge opening therein, means included in said framed enclosure and with at least one of said divider plates defining a sealed plenum chamber through which air is directed to the filtering operation of the filtering apparatus, means connected to the plenum chamber for causing contaminated air to be directed into the filtering elements of the filtering apparatus at the open upper extremities thereof and through the walls of the filtering elements with the particulates being collected on the inner walls of the tubular filtering elements, and means including a high pressure air supply and associated with the open extremities of each of the tubular filtering elements for selectively creating outwardly directed pulsed air curtains at the ends of each of selected filtering elements and out of the filter elements to block airflow therethrough and create a drop of pressure within said selected filtering elements causing collapse of said selected filtering elements to remove particulates from the inner walls thereof and causing the particulates to be directed into the dust chamber with the force of gravity thereon.

7. The filtering apparatus of claim 6 in which the means including the high pressure air supply and associated with the tubular filtering elements create the air curtains at the extremities of the tubular filtering elements and include a jet nozzle positioned at the upper extremity of the bag type filters and directing air therefrom to form the air curtain at the inlet extremity of the tubular filtering element with additional nozzle means directing air to form an air curtain at the other extremity of the filtering element.

8. The filtering apparatus of claim 7 in which the additional nozzle means includes a nozzle pipe extending part way through the filtering element from the jet nozzle and directed toward the other open extremity of the filtering element to create the air curtain at said other extremity of the filtering element.

9. The filtering apparatus of claim 6 in which the means including the high pressure air source and associated with the open extremities of the tubular filtering elements includes nozzle means positioned at the open extremities of the filtering elements and adapted to receive high pressure air simultaneously from the source to create air curtains simultaneously at the extremities of the filtering elements.

10. The filtering apparatus of claim 9 in which the nozzles which direct air out of the confines of the filtering element create a pumping action therein and the drop in pressure within the filtering element.

11. The filtering apparatus of claim 10 in which the nozzle means at each extremity of the filter element are connected to a common manifold and to the high pressure air supply through a valve which controls simultaneous flow from the high pressure air supply to the nozzle means at each extremity of the filtering element.

12. The filtering apparatus of claim 11 and including control circuit means connected to each of the control valves to selectively operate the same in a programmed sequence in which only a single valve for the plurality of filtering elements will become operative at one time and with a series of periodic pulsed operations while the remainder of the valves remain inoperative and in which a different valve is operated thereafter until all of the valves have become operative to cause air curtains to be created at the extremities of the respective filter elements in a continuous filtering and cleaning operation of the filtering apparatus.

13. The filtering apparatus of claim 6 in hich the plenum chamber is formed between the first named divider plate and the framed enclosure and surrounding the openings in the divider plate to define the inlet side of the filtering apparatus common to the open upper extremities of the filtering elements.

14. The filtering apparatus of claim 6 in which the plenum chamber is located between and connected to the first and second named divider plates enclosing the filtering elements extending therebetween and defining the outlet side of the filtering apparatus.

15. The filtering apparatus of claim 6 in which the framed enclosure and the first and second named divider plates define a second plenum chamber extending between the divider plates and surrounding the filtering elements extending therebetween defining an outlet of the filtering apparatus with the means causing contaminated airflow to be directed into the filtering elements being connected to one of the plenum chambers.

* * * * *